United States Patent [19]
Craun et al.

[11] Patent Number: 5,877,239
[45] Date of Patent: Mar. 2, 1999

[54] AQUEOUS MICROGEL FROM CARBOXYL LATEX POLYMER, ACRYLIC-EPOXY AND DIEPOXIDE

[75] Inventors: Gary P. Craun, Berea; Beth A. Smith, Broadview Heights, both of Ohio; Neal S. Williams, Bracknell, United Kingdom

[73] Assignee: The Glidden Company, Cleveland, Ohio

[21] Appl. No.: 916,716

[22] Filed: Aug. 18, 1997

[30] Foreign Application Priority Data

May 1, 1997 [GB] United Kingdom .................... 9708823

[51] Int. Cl.$^6$ ............................. C08K 3/20; C08L 33/02; C08L 63/00; C08L 63/02
[52] U.S. Cl. ..................... 523/403; 523/409; 523/412
[58] Field of Search ................... 523/403, 409, 523/412

[56] References Cited

U.S. PATENT DOCUMENTS

| | | | |
|---|---|---|---|
| 4,446,258 | 5/1984 | Chu et al. | 523/408 |
| 4,683,273 | 7/1987 | Bode | 523/412 |
| 5,201,436 | 4/1993 | Owens et al. | 523/408 |
| 5,508,325 | 4/1996 | Craun et al. | 523/410 |
| 5,576,360 | 11/1996 | Craun et al. | 523/408 |

*Primary Examiner*—Robert E. Sellers
*Attorney, Agent, or Firm*—Thomas M. Schmitz

[57] ABSTRACT

An aqueous protective coating composition particularly useful for can coatings based on a polymeric binder comprises diepoxide crosslinked microgel particles. The microgel polymer is produced by dispersing into water a carboxyl functional acrylic-epoxy copolymer and combined with a carboxyl functional latex polymer along with a low molecular weight diepoxide, followed by coreaction and crosslinking between the carboxyl polymers and the diepoxide to form stable aqueous dispersed microgel particles. In a preferred aspect of the invention, the carboxyl latex polymer is a swollen latex polymer.

16 Claims, No Drawings

AQUEOUS MICROGEL FROM CARBOXYL LATEX POLYMER, ACRYLIC-EPOXY AND DIEPOXIDE

This invention pertains to latex polymer in combination with acylic-epoxy copolymers crosslinked with low molecular weight diepoxide to provide microgel polymeric binders useful for protective surface coatings applied to substrates and particularly useful as can coatings for beverage and food containers.

BACKGROUND OF THE INVENTION

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for the pigments, fillers, and other additives where the epoxy resins advantageously provide toughness, flexibility, adhesion, and chemical resistance. Water-dispersed coating compositions containing epoxy resins are highly desirable for can coating compositions and particularly useful for interior surfaces of containers. Coatings for soft drink and beer cans, for instance, are critical due to taste sensitivity wherein such can coatings must not alter the product taste of beverages in the containers. Taste problems can occur in a variety of ways such as by leaching of coating components into the beverage, or by absorption of flavor by the coating, or sometimes by chemical reaction, or by perhaps some combination thereof.

Container coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then reduced with water by a direct or inverse let down procedure. Although cured film properties are highly desirable, such coatings suffer from the fact that sizeable amounts of solvents are required to obtain good performance. High molecular weight epoxy resins typically require 25% to 50% solvent (based on total solids plus organic solvent) before reducing with amine and water.

Epoxy based can coatings comprising a carbon grafted acrylic chain are disclosed is commonly assigned U.S. Pat. No. 4,212,781 which teaches a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids. The acrylic grafted epoxy is particularly useful when utilized with a coreactive crosslinking melamine crosslinker, Aqueous coating compositions based on microgel resin reaction product obtained by the esterification reaction of epoxy resin with carboxyl group containing vinyl polymer are disclosed in U.S. Pat. No. 4,897,434 where major amounts of high molecular weight epoxy are esterified in organic solvent with the carboxyl vinyl polymer to produce a non-gelled epoxy ester. The epoxy ester is subsequently dispersed into water followed by further coreacting of available epoxy and carboxyl groups on the preformed epoxy ester to form a microgel product. In commonly assigned U.S. Pat. No. 5,508,325, aqueous dispersed microgel polymers are produced by dispersing carboxyl functional acrylic-epoxy copolymer resin into water followed by dispersion of diepoxide and then crosslinking of the carboxyl copolymer by the diepoxide.

It now has been found that excellent aqueous dispersed protective coating compositions exhibiting improved film integrity properties can be prepared based on a polymeric binder comprising an aqueous dispersed carboxyl functional latex polymer combined with an acrylic-epoxy copolymer and subsequently crosslinked with low molecular weight diepoxide to form aqueous dispersed microgel polymer particles. In this invention, preferred latexes are first swollen with minimal additions of base such as amine or ammonia prior to crosslinking with the diepoxide. In a preferred aspect of this invention, the swollen carboxyl functional latex is mixed with an aqueous dispersed acrylic-epoxy carboxyl functional copolymer, whereupon the liquid diepoxide is added to the resulting polymeric mixture and heated for sufficient time to permit crosslinking between the carboxyl functionalities and the diepoxide resin. Swollen latex polymers provide more body and increase viscosity of the polymeric mixture along with high molecular weight while maintaining desired rheology control and achieving very low VOC coatings. By using latex polymers, much higher molecular weight polymers can be utilized while the VOC can be considerably reduced. Minor amounts of acrylic-epoxy copolymer enables dispersion of the diepoxide into the latex polymer. The paint films produced from the polymeric microgel polymer particles exhibit excellent water resistance along with clear glossy protective films. When the paint films are baked, the dispersion polymers further react where the microgel polymer particles cure together by an esterification reactions to yield a tough, water resistant film. These and other advantages of this invention will become more apparent by referring to the detailed description of the invention and the illustrative examples.

SUMMARY OF THE INVENTION

Briefly, the invention pertains to aqueous dispersed protective coating compositions comprising a polymeric binder containing low levels of organic solvent produced by mixing a carboxyl functional emulsion latex polymer with a carboxyl functional acrylic-epoxy copolymer, dispersing a low molecular weight diepoxide into the polymeric mixture, followed by crosslinking of the carboxyl functional latex polymer and carboxyl functional acrylic-epoxy copolymer with the diepoxide to provide stable water dispersed microgel polymer particles useful as a polymeric binder in paint coatings. The crosslinked aqueous dispersed microgel polymers comprise by weight between 1% and 95% latex polymer, between 1% and 95% acrylic-epoxy copolymer, with balance being crosslinking diepoxide. In a further aspect of the invention, the carboxyl functional acrylic-epoxy copolymer is mixed with a swollen carboxyl latex polymer, where both carboxyl polymers are coreacted and crosslinked with the diepoxide to form aqueous dispersed crosslinked microgel particles.

DETAILED DESCRIPTION OF THE INVENTION

The aqueous dispersed microgel polymer of this invention is based on a carboxyl functional latex combined with carboxyl functional acrylic-epoxy copolymer, where the carboxyl functionality is crosslinked with low molecular weight diepoxide in the aqueous dispersion to produce aqueous dispersed microgel polymer particles.

Referring first to the carboxyl functional latex emulsion polymer useful in this invention, latex polymers comprise aqueous emulsion addition copolymerized ethylenic monomers in the presence of surfactants and initiators to produce emulsion polymerize polymer particles. Ethylenically unsaturated monomers contain carbon to carbon double bond unsaturation and generally include vinyl monomers, styrenic monomers, acrylic monomer, allylic monomers, acrylamide monomers, as well as carboxyl functional monomers. Vinyl monomers include vinyl esters such as vinyl acetate, vinyl propionate and similar vinyl lower alkyl esters, vinyl halides, vinyl aromatic hydrocarbons such as styrene and substituted styrenes, vinyl aliphatic mononmers such as alpha olefins and conjugated dienes, and vinyl alkyl ethers uch as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include for instance methyl, ethyl, butyl, and propyl acrylates and methacrylates, 2-ethyl hexyl acrylate and methacrylate, cyclohexyl, decyl, and isodecyl acrylates and methacrylates, and similar various acrylates and methacrylates. In accordance with this invention, the latex polymer contains copolymerized carboxyl functional monomers such as acrylic and methacrylic acids, fumaric or maleic or similar unsaturated dicarboxylic acid, where the preferred carboxyl monomers are acrylic and methacrylic acid. The carboxyl functional latex polymers comprise by weight between about 1% and 50% copolymerized carboxyl monomers with the balance being other copolymerized ethylenic monomers. The latex polymers have a number average molecular weight between about 10,000 and 10,000,000 as measured by gel permeation chromotagraphy (GPC). The Tg or softening point of the swollen latex polymer can be between 20 and 150 degrees centigrade as calculated by the Fox equation or measured by ASTM 3418-75. The carboxyl functional latex should have an acid no. above 15 and preferably above 30.

To produce the carboxyl functional latex polymers, the ethylenically unsaturated monomers including carboxyl monomers are copolymerized in an aqueous polymerization medium by adding the ethylenic monomers to water along with surfactants and polymerizing catalysts or initiators as well as other emulsion polymerization ingredients. Initiators can include for example typical free radical and redox types such as hydrogen peroxide, t-butyl hydroperoxide, di-t-butyl peroxide, benzoyl peroxide, benzoylpeoxide, 2,4-dichlorbenzoyl peroxide, t-butylperacetate, azobisisobutyronitrile, ammonium persulfate, sodium persulfate, potassium persulfate, sodium and potassium perphosphates, and redox initiators such as persulfate sodium formaldehyde sufoxylate, cumene hydroperoxide sodium metabisulfite, potassium persulfate sodium bisulfite, cumene hydroperoxide iron (II) sulfate and the like. Polymerization initiators are usually added in amounts between about 0.1 and 2 percent by weight of the monomers polymerized. Suitable anionic surfactants include for example salts of fatty acids such as sodium and potassium salts of stearic, palmetic, oleic, lauric, and tall oil fatty acids, salts of sulfated fatty alcohols, salts of phosphoric acid esters of polethylated long chain alcohols and phenols, as well as sulfosuccinates such as dihexyl, dioctyl, ditridecyl and dodecylbenzene sulfonate. Suitable non-ionic surfactants include polyoxyethlene glycols reacted to a lyophilic compound to produce a hydrophile lyophile balance (HLB) greater than two and preferably between 10 and 15, such as commercially known surfactants such as Triton surfactants, Igepal CA surfactants, and Tweens.

In a preferred aspect of this invention, the latex emulsion polymer is swollen by adding a base to the latex, where ammonia or an amine or mixtures thereof are the preferred bases. Hydroxyl bases are useful but less preferred. The amount of base added is to partially swell the latex and neutralize between 1% and 100% of the carboxyl groups on the latex polymer. On a weight basis, typically between 1% and 50%, and preferably between 3% and 15% of base is added based on the polymeric weight of the latex polymer being transformed into a partially swollen latex polymer. The base is added at the completion of the latex polymer formation and mixed in with ordinary agitation until a partially swollen latex is formed. The base ordinarily is diluted with water to control viscosity during the mixing and swelling process.

In accordance with this invention, the swollen latex is combined with an acrylic-epoxy copolymer prior to the step of microgel formation. The acrylic-epoxy copolymer is a copolymer comprising epoxy resin coreacted with ethylenic monomers including carboxyl monomers to produce an epoxy-acrylic copolymer. The preferred epoxy-acrylic copolymer comprises an epoxy-acrylic graft copolymer containing epoxy resin, epoxy-acrylic graft copolymer, and ungrafted addition polymer produced by polymerizing ethylenically unsaturated monomers in-situ with epoxy resin in the presence of a peroxide. The in situ polymerization of monomers generally comprises reacting the ethylenically unsaturated monomers in the presence of epoxy with about 1% to 10% peroxide by weight based on the monomer copolymerized. The in-situ formed carboxyl-functional copolymer can have a molecular weight between 1,000 and 100,000 and preferably between 2,000 and 20,000. The carboxyl content (COOH) should comprise at least 5% by weight of the monomer mixture and preferably should be above 15%. The acid number of the acrylic-epoxy copolymer should be above 30 and preferably between 70 and 300 mg KOH per gram of resin solids. Based on the weight of the acrylic-epoxy copolymer, the copolymerized acrylic or methacrylic acid content preferably is between 5% and 50% by weight of the copolymer.

The epoxy resin portion of the epoxy-acrylic copolymer mixture can be either aliphatic or aromatic, although the aromatic epoxy resins are preferred. The most preferred epoxy resins are polyglycidyl ethers of bisphenol-A, especially those having 1,2-epoxy equivalency of from about 1.3 to about 2. The molecular weight should be from about 350 to about 20,000 and preferably, for sanitary coating compositions, from about 2,000 to about 10,000. Mixtures of monoepoxides and diepoxides are desirable. Another procedural variation is the introduction of the aromatic polyether which is devoid of oxirane functionality by reacting epoxide groups with benzoic acid, fatty acid, phenol or similar monoreactive epoxide blocking agent. In preferred practice, the epoxy resin is a mixture including aromatic polyether having a single oxirane group and aromatic polyether having two oxirane groups which maximizes compatibility.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4, 4'dihydroxy bisphenol, with the most preferred being bisphenol-A. Halohydrins include epichlorohydrin, dichlorohydrin, and 1,2-dichloro 3-hydroxypropane with the most preferred being epichlorohydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, excess molar equivalents of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are poly-glycidyl ethers of bisphenol-A having terminating 1,2-epoxide groups and an epoxy equivalent weight between 2,000 and 10,000, and a number average molecular weight from about 4,000 to 20,000 as measured by gel permeation chromatography (GPC). Commercially available epoxy resins include Dow Chemical epoxy resins identified by trade number and equivalent molecular weights as follows: DER 661 (525); DER 664 (900); while Shell Chemical epoxy resins are EPON 1001 (525); EPON 1007 (2000); EPON 1009F (3000); and Ciba-Geigy linear epoxy resins GT-7013 (1400); GT-7014 (1500); GT7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

The acrylic component of the epoxy-acrylic copolymer comprises polymerized ethylenically unsaturated monomers which include carboxyl functional monomers such as acrylic acid, and lower alkyl substituted acrylic acids such as methacrylic acid, and unsaturated dicarboxylic acids such as maleic or fumaric, to provide carboxyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are nonreactive but copolymerizable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those commercially available monomers having vinyl unsaturation and include styrenic monomers such as styrene, vinyl toluene, divinyl benezene, isoprene and butadiene. The acrylic, methacrylic or similar unsaturated carboxyl monomer preferably comprises by weight between about 5% and 50% based on the weight of the acrylic grafted epoxy copolymer. Based on monomer weights copolymerized, the preferred acrylic acid or methacrylic acid monomer should comprise between 5% and 99% of the monomer copolymerized.

The preferred epoxy-acrylic copolymer mixture is prepared by in-situ non-aqueous polymerization of the ethylenic monomers with epoxy resin. The epoxy resin can be heated in the absence of water in a reactor wherein the polymerizable monomer can be added slowly over a period of at least two or three hours along with a solvent and a free radical initiator. Although the reaction may be conducted in the absence of solvent, a solvent is preferred for the in-situ polymerization of monomers in the presence of epoxy resin. Solvents such as xylene, benzene, ethyl benzene, toluene, and the alkoxy alkanols are satisfactory. Alcohols such as methanol, ethanol, propanol, butanol, and the like, are suitable, with butanol being preferred. Ethylene glycol monobutyl ether, ethylene glycol monohexyl ether, ethylene glycol monobutyl ether acetate, and the like, hexane, mineral spirits, and the like, are also suitable. For subsequent dispersion into water, the solvents selected should be water-soluble materials, such as acetone, butanol, ethanol, propanol, ethylene glycol monoethyl ether, and the like. Ordinarily the amount of solvent may be in the range from about 5% to 40% by weight of the sum of the other components.

In practice, the epoxy resin and the mixture of polymerizable monomers are reacted together in the presence of a free radical initiator, preferably of the peroxide type, where benzoyl peroxide and t-butyl perbenzoate are most preferred. Typical and useful free radical initiators include cumene hydroperoxide, benzoyl peroxide t-butyl perbenzoate, t-butyl peroxide, lauryl peroxide, methyl ethyl ketone peroxide, dicumyl peroxide, chlorobenzoyl peroxide, and the like. Benzoyl peroxide and t-butyl perbenzoate are preferred as the free radical initiator for use in the practice of the present invention. The amount of free radical catalyst is expressed in terms of percentage by weight of peroxide based on the total weight of the polymerizable monomer, or equivalent, at the temperature of use. The amount of peroxide catalyst should be at least about 1% and preferably between 2% and 10% by weight peroxide initiator based on the weight of ethylenic monomers copolymerized. The monomers and initiators are heated at a reaction temperature preferably maintained in the range from about 80° C. to about 180° C., although the temperature may be adjusted within a relatively wide range to accommodate the reactivity of the mixture. Operating temperatures in the range from about 30° C. to about 200° C. are feasible, depending upon the end results and operating conditions selected, although the preferred temperature range is between 100° C. and 150°

C. After the monomers are added, the reaction mixture is normally held for up to three hours at reaction temperature to complete the monomer conversions. The in-situ polymerization of the monomers produces an in-situ formed carboxyl functional polymer containing at least about 5% of polymerized acid monomer based on the total weight of monomers. The acrylic-epoxy copolymer should have an acid number above about 30 and preferably between 70 and 400 mgm KOH per gram of polymer. The epoxy-acrylic copolymer composition comprises by weight between about 10% and 95% acrylic polymer and between about 5% and 90% epoxy resin. The epoxy-acrylic copolymer is prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like, as more particularly described in U.S. Pat. No. 4,212,781.

In accordance with this invention, a low molecular weight diepoxide is added to the carboxyl functional latex polymer and the water dispersed carboxyl functional acrylic-epoxy copolymer to provide crosslinking and microgel formation by heating moderately the aqueous polymeric mixture. The low molecular weight diepoxide resins useful for crosslinking the carboxyl functional acrylic graft epoxy copolymers are predominantly linear chain molecules comprising the coreaction product of polynuclear dihydroxy phenols or bisphenols with halohydrins to produce epoxy resins containing preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce diepoxide epoxy resins where up to two moles of epichlorohydrin coreact with one mole of bisphenol-A, although less than complete reaction can produce difunctional epoxy resin along with monoepoxide chains terminated at the other end with a bisphenol-A unit. The preferred linear epoxy resins are polyglycidyl ethers of bisphenol-A having terminating 1,2-epoxide groups (oxirane groups) and a number average molecular weight between 200 and 10,000 and preferably from about 360 to 1,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); EPON 1001 (1050); and Ciba-Geigy linear epoxy resins GT-7013 (1400); GT-7014 (1500); GT-7074 (2000) and GT-259 (1200). The epoxy equivalent weight should be between 100 and 5,000 while the preferred epoxy equivalent weight is between 100 and 1,000, and more preferably between 180 and 500. High equivalent weight epoxy resins do not disperse well, although epoxy blends containing minor amounts of higher molecular weight epoxy resins are workable. Diepoxides include branched epoxies comprising branched chains where at least two of the chains contain terminal epoxide groups. Branched diepoxides having two or more terminal epoxide groups can be produced by coreacting epichlorohydrin with polynuclear polyhydroxy phenols, trifunctional phenols, or aliphatic trifunctional alcohols.

Diepoxide resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions while suitable molecular weight range of alkylene oxide resins is between 200 and 10,000 where preferred molecular weights are between 200 and 1,000 as measured by GPC.

In accordance with the preferred aspect of this invention, liquid diepoxide resin such as DER 333 (Dow) or Epon 828 (Shell) can be blended with the acrylic-epoxy resin prior to, or after inversion into water. If diepoxide is added to acrylic-epoxy copolymer prior to inversion (dispersion) into water, care must be taken to avoid acid coreaction of the diepoxide with carboxyl groups on the acrylic epoxy copolymer and resulting gelation. The preferred method is to disperse the acrylic-epoxy copolymer into water and thereafter disperse the diepoxide into the aqueous dispersed acrylic-epoxy copolymer or into the preformed mixture of acrylic-epoxy and latex polymers. Low molecular weight liquid diepoxides are preferred and can be easily dispersed into the latex polymer by using minor amounts of epoxy-acrylic copolymer as an aqueous dispersing agent.

After diepoxide is dispersed into the latex polymer, or preferably into the mixture of latex polymer and acrylic-epoxy copolymer, heat can be applied to increase the rate of the acid-epoxy crosslinking reaction. Catalysts such as tertiary amines, phosphines, pyridine, and the like can be added at low levels (0.1 to 1%) to further increase the acid-epoxy reaction rate. If tertiary amine is used as a portion of the neutralizing base, up to 10% additional amine can be used. Alternatively, the acid-epoxy reaction in water can occur at room temperature over a long period of time. Viscosity generally rises as this reaction occurs. The resulting epoxy crosslinked latex addition copolymer and acrylic-epoxy copolymer comprise an aqueous micro-dispersion of very small crosslinked polymer particles having a mean microgel particle size below 5 microns, desirably less than I micron, and preferably less than 0.5 micron size particles. The carboxyl functional latex polymer and the acrylic-epoxy copolymer crosslinks with the the low molecular weight diepoxide resin to provide microgel polymer particles having an acid no. above 30 and preferably between 50 and 150. The aqueous dispersed, crosslinked latex and acrylic-epoxy crosslinked microgel particles provide excellent film forming properties.

In a further desireable modification of this invention, non-swollen soft, low Tg latex polymer can be intermixed with the swollen latex and the acrylic-epoxy copolymer before crosslinking with diepoxide. The non-swollen latex polymer is an in-situ formed latex polymer produced by emulsion copolymerization of ethylenic monomers in the water dispersed acrylic-epoxy copolymer or in the aqueous swollen latex polymer or in an admixture of the two polymers. Soft Tg monomers are acrylate monomers generally and typically include methyl acrylate, ethyl acrylate, propyl acrylate, butyl acrylate, and similar lower alkyl acrylates. Soft Tg monomers are balanced with styrene and other harder Tg monomers such as methylmethacrylate to provide a desired Tg between about −70 and 50 degrees C., where the the low Tg latex polymer imparts flexibility and resilience to the dried paint film. The non-swollen latex can be formed in-situ by emulsion polymerization of the monomers in the presence of one of the aqueous dispersed polymers or the polymeric mixture. Preferred initiators for promoting copolymerization of the ethylenic monomers are non-ionic peroxides such as t-butyl peroctoate, Luperson 11, and benzoyl peroxide. In accordance with this aspect of the invention, the crosslinked microgel particles comprise by weight between about 1% and 90% swollen latex polymer, between about 1% and 80% acrylic-epoxy copolymer, between about 1% and 75% non-swollen soft Tg latex polymer, with the balance comprising crosslinking diepoxide resin.

The microgel dispersions of this invention have particle sizes under 5 microns and can be used as polymeric binders in coatings for containers. The resulting epoxy crosslinked microgel polymer particles produced by crosslinking carboxyl functional swollen latex polymer and acrylic-epoxy copolymer with diepoxide surprisingly provides highly crosslinked copolymers in the form of a stable aqueous microdispersion of small internally crosslinked microgel polymer particles. Excellent protective film formations on substrates are achieved even though the microgel particles are internally highly crosslinked. Aqueous dispersions of these blended resins can be prepared in water with ammonia neutralization with minimal use of volatile solvent and at VOC levels below about one pound per gallon of resin solids and preferably about 0.5 pound per gallon of resin solids. Cured paint films exhibit excellent water resistance, and good clarity and gloss.

For spraying, preferably the coating composition contains between about 10% and 30% by weight polymeric solids relative to 70% to 90% water including other volatiles such as minimal amounts of solvents, if desired. For applications other than spraying, the aqueous polymeric dispersions can contain between about 10% and 40% by weight polymer solids. Organic solvents can be utilized if desired to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 150° C. to 220° C. or higher for time sufficient to effect complete curing as well as volatilizing of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this regard, all parts are parts by weight, all percentages are weight percentages, and temperatures are degrees Centigrade, unless otherwise expressly noted.

EXAMPLE 1

A. A carboxyl functional latex polymer was produced from raw materials as follows.

| Weight (grams) | Raw material |
| --- | --- |
| a) 1923 | Water |
| 9.6 | Dioctyl sulfosuccinate, 75% (Aerosol OT-75) |
| b) 51 | Water |
| 12 | Ammonium persulfate |
| c) 702 | Styrene |
| 378 | Methacrylic acid |
| 7.2 | Aersol OT-75 |
| 270 | Ethyl acrylate |
| 39 | n-hexanol |

Components (a) were warmed under nitrogen to 70 degrees C., then 135 grams of component (c) was added and held for five minutes, and then components (b) were added and held for 30 minutes. The remainder of component (c) was added over three hours, and held for 30 minutes at 70 degrees C.

B. Formation of an acrylic-epoxy copolymer intermediate.

| | | |
| --- | --- | --- |
| a) | 120 grams | Solid epoxy, m. wt. 6,500 (Epon 1009) |
| | 45.5 | Hexyl cellosolve |
| | 45.5 | Butyl cellosolve |
| b) | 2.7 | Benzoyl peoxide, 78% |
| | 18.6 | Hexyl cellosolve |
| | 10 | Methacrylic acid |
| | 15 | Styrene |
| | 5 | Ethyl acrylate |
| c) | 5.5 | Dicumyl peroxide |
| | 82.5 | Methacrylic acid |
| | 137.5 | Styrene |
| | 55 | Ethyl acrylate |
| d) | 100 | Water |
| | 3.6 | Dimethylethanol amine |
| | 16 | Ammonium, 28% |
| e) | 1006 | Water (70 degrees C.) |

Components (a) were heated to 117 degrees C. and then components (b) were added over one hour. The reaction mixture was heated to 150 degrees C. and then components (c) were added over two hours, and then held at 150 degrees C. for 30 minutes. The resulting acrylic-epoxy copolymer was then inverted into water by adding components (d) slowly at first and then rapidly over 3 minutes. The mixture was allowed to cool by reflux and held one-half hour at 95 degrees C. The resulting resin mixture was mixed with component (e) with vigorous agitation (300 rpm) to complete the inversion. The resulting aqueous dispersed acrylic-epoxy contained by weight 80% epoxy and 20% acrylic copolymer, the aqueous composition was 24% by weight solids, and had an acid no. of 90 mg of KOH/gm of resin solids.

C. Formation of a latex containing a low Tg latex polymer.

| | | |
| --- | --- | --- |
| a) | 500 grams | Latex "A" from above |
| b) | 834 | Water |
| | 10 | Dimethylethanol amine (DMEA) |
| | 6.8 | Ammonia (28% aqueous solution) |
| c) | 62.6 | Butyl acrylate (BA) |
| | 62.6 | Styrene |
| d) | 2.5 | t-butyl peroctoate (TBPO) |

Components (b) were to component (a) while stirring. The mixture was then heated to 90 degrees C. and held for one hour. Component (c) was then added and the reaction mixture was held at 90 degrees C. for one-half hour. Component (d) was added and mixture temperature was held at 90 degrees for three hours and then cooled to room temperature.

PREPARATION OF A COATING COMPOSITION

A coating composition was made from the above compositions by mixing polymeric composition C with 223 grams of polymeric composition B and 13 grams of water. the mixture was heated to 90 degrees C., and then liquid epoxy DER 333 (Dow Chemical) having an epoxy equivalent weight of 180 was added. The mixture was held at 90 degrees C. for two hours and then cooled to room temperature. The resulting polymeric mixture comprised a stable aqueous dispersed microgel containing by weight 19% resin solids and having a #4 Ford cup viscosity of 18 seconds at 25 degrees C.

EXAMPLE 2

A coating composition was made from resin compositions in Example 1 as follows.

| a) | 93.8 grams | Latex "A" |
|---|---|---|
| b) | 277 | Water |
| | 2.8 | DMEA |
| | 1.8 | Ammonia (28% aqueous solution) |
| c) | 357 | Acrylic-epoxy composition "B" |
| d) | 25.9 | Butyl acrylate |
| | 25.9 | Styrene |
| e) | 1.0 | TBPO |
| f) | 31.5 | DER 333 liquid epoxy |

Components (b) were added to component (a) while stirring at 20 degrees C. Component (c) was then added and the mixture was heated to 90 degrees under nitrogen and held at that temperature for one hour. Component (d) was added and the reaction mixture temperature was held for one-half hour. Component (e) was added and the reaction mixture was held an additional two hours at 90 degrees C. The resulting polymeric mixture comprised stable aqueous dispersed microgel particles having a Ford #4 viscosity of 15 seconds at 19% resin solids by weight at 25 degrees C.

EXAMPLE 3

A latex composition comprising a swollen latex and in-situ formed soft latex was produced according to Example 1 part "C" except that that the ammonia content in component (b) was reduced to 2.8 grams and the water in component (b) was increased to 838 grams. The resulting latex in the amount of 295 grams was mixed with 81.4 grams of acrylic-epoxy composition "B" along with 109 grams of water. The mixture was heated to 90 degrees C., whereupon 15 grams of DER 333 were added, held for two hour at 90 degrees C., and then cooled to room temperature. The resulting polymeric composition was a stable aqueous dispersed microgel having a Ford #4 cup viscosity of 23.7 seconds at 19% resin solids at 25 degrees C.

TEST RESULTS

Coating composition products from Examples 1, 2 and 3 were spray applicied to aluminum substrate interior surfaces of beverage cans at the substrate surface coverage rate of 100 to 140 mgms dried coating per can substrate, and baked at 360 degrees F. for 30 seconds peak metal temperature. All three coating compositions produced glossy, smooth, clear films. Each can was soaked in 1% Joy detergent solution at 180 degrees F. for 10 minutes. Blush was very slight to none for each cured film.

EXAMPLE 4

Step 1. Preparation of latex

| Weight (grams) | Raw material |
|---|---|
| a) 560 | Water |
| 4.0 | Aerosol OT-75 surfactant (union Carbide) |
| b) 14 | Styrene |
| 6.0 | Ethyl acrylate |
| c) 2.0 | Ammonium persulfate |
| 34 | Water |
| d) 40 | Methacrylic acid |
| 76 | Styrene |
| 74 | Ethyl acrylate |
| e) 40 | Methacrylic acid |
| 70 | Styrene |
| 80 | Ethyl acrylate |
| 4.0 | n-Hexanol |

Components were heated to about 70 degrees C. under nitrogen purge for one hour. After five minutes, components (b) and then components (c) were added. The reaction mixture was held 30 minutes, and then components (d) were added over 1.5 hours followed by the addition of components (e) over 1:5 hours. The reaction mixture was then held at 70 degrees C. for one hour and then cooled.

Step 2. Latex modified with low Tg polymer.

Using the latex formed in step 1 above, 10 grams of dimethylethanol amine in 834 grams of water were added to 500 grams of the latex formed in step 1 above. The mixture was held at 90 degrees C. for one hour. Then, 62.2 grams of butyl acrylate and 62.6 grams of stryrene were added and the reaction mixture was held at 90 degrees C. for 30 minutes. Then, 2.5 grams of t-butylperoctoate were added and the reaction mixture was held for three hours at 90 degrees C.

Step 3. Preperation of acrylic-epoxy graft copolymer.

| a) | 310 grams | DER 333, Dow liquid epoxy, Eqv. wt. of 175 |
|---|---|---|
| | 98.5 | Hexcyl; Cellosolve |
| | 0.9 | Ethyltriphenylphosphonium acetate |
| | 167 | Bisphenol A |
| b) | 1.8 | Water |
| c) | 148 | Hexyl cellosolve |
| d) | 137 | Styrene |
| | 338 | Metharcylic acid |
| | 3.5 | Ethyl acrylate |
| | 34 | t-Butylperbenzoate |
| e) | 282 | Dimethylethanol amine |
| | 282 | Water |
| f) | 2019 | Water |

Components (a) were heated to about 110 degrees C. under vacuum, then the vacuum was removed and replaced with a nitrogen sparge when about 15 grams of solvent had been removed. An additional 15 grams of freash hexyl cellosolve was added to the reactor. The reaction mixture was allowed to exotherm and reach 180 degrees C. and then held for 45 minutes to reach a cone and plate viscosity about 180 poise. Component (b) was then added and the reaction mixture cooled to 155 degrees C. over 10 minutes. Component (c) was added followed by the addition of components (d) over about three hours. The reaction mixture was held for at 155 degrees C. for 30 minutes and then cooled to 120 degrees C. Components (e) were added over three minutes while cooling to 95 degrees C., and then held for 30 minutes. Component (f) was added over 30 minutes to form an aqueous dispersion.

Step 4. Formation of an aqueous dispersed microgel.

To form a microgel, 294 grams of the modified latex formed in step 2 above were mixed with 80 grams of the dispersion formed in step 3 above, the mixture was heated to 90 degrees C., then 1.5 grams of ammonium hydroxide (28%NH3) in 18.5 grams of water were added, followed by the addition of 15 grams of DER 333, and then the mixture was heated at 90 degrees C. for two hours.

Step 5. Test results.

The aqueous dispersed microgel formed in step 4 was applied as a coating film over a metal substrate as described in Test Results in Example 3 with comparable favorable results.

Although the merits of this invention have been specifically described and illustrated in the examples, the invention is not intended to be limited except by the appended claims.

We claim:

1. An aqueous dispersed coating composition containing an aqueous dispersed polymeric binder, the polymeric binder comprising:

an aqueous dispersed microgel containing a carboxyl functional latex polymer of emulsion polymerized ethylenic monomers including carboxyl functional monomers to provide an acid no. of above 15, a carboxyl functional acrylic-epoxy copolymer having an acid no. of above 30, the latex polymer and the acrylic-epoxy copolymer crosslinked with a low molecular weight diepoxide resin having an epoxide equivalent weight between 100 and 5000, where the microgel contains by weight of between 1% and 95% of latex polymer, between 1% and 95% of said acrylic-epoxy copolymer, with the balance being the crosslinking diepoxide resin;

the acrylic-epoxy copolymer produced by the non-aqueous copolymerization of ethylenically unsaturated onomers in the presence of an epoxy resin at temperatures between about 80° C. and 180° C. in the presence of at least 1% or a peroxide initiator based on the weight of the monomers, the ethylenic monomers having by weight at least 5% of a carboxyl monomer, to produce the carboxyl functional acrylic-epoxy copolymer having an acid no. of above about 30, wherein said copolymer is dispersed in water by neutralizing at least part of the carboxyl functionality on said acrylic-epoxy copolymer to form a water dispersed acrylic-epoxy copolymer, wherein the water dispersed acrylic-epoxy copolymer is mixed with the latex polymer and the diepoxide, wherein the diepoxide is reacted with the carboxyl acrylic-epoxy coploymer and the carboxyl functional latex polymer to form aqueous dispersed crosslinked microgel particles having a particle side of below 5 microns.

2. The coating composition of claim 1 where the carboxyl functional latex polymer is a swollen latex polymer being partially neutralized with base to neutralize between 1% and 100% of the carboxyl groups on the latex polymer.

3. The coating composition of claim 2 where the carboxyl functional latex polymer and the carboxyl functional acrylic-epoxy coploymer are crosslinked with a low molecular weight diepoxide resin having a number average molecular weight of between 200 and 5000 and an epoxide equivalent weight of between 100 and 2500, wherein the diepoxide resin is dispersed into the aqueous dispersion and is reacted to form aqueous dispersed crosslinked microgel particles.

4. The coating composition of claim 2 wherein the diepoxide resin has a molecular weight of between 360 and 1,000.

5. The coating composition of claim 2 wherein the diepoxide resin has an epoxide equivalent weight of between 100 and 1,000.

6. The coating composition of claim 2 wherein the polymeric binder contains by weight between 5% and 50% of the acrylic-epoxy copolymer, between 30% and 80% of the swollen latex polymer, with the balance being the diepoxide resin in said microgel particles.

7. An aqueous dispersed coating composition containing an aqueous dispersed polymeric binder, the polymeric binder comprising:

an aqueous dispersed microgel of a carboxyl functional acrylic-epoxy graft copolymer having an acid no. of above about 30 dispersed into water with a carboxyl functional latex polymer having an acid no. above 15, wherein the carboxyl functional acrylic-epoxy graft copolymer and polymers latex are crosslinked with a low molecular weight diepoxide resin having an epoxide equivalent weight of between about 100 and 5000 to form the aqueous dispersed microgel, wherein the microgel contains at least 1% of the carboxyl functional acrylic-epoxy graft copolymer.

8. The aqueous dispersed coating composition of claim 7 wherein the coating contains between 1% and 10% of the acrylic-epoxy graft copolymer based on the weight of polymers in the coating.

9. The coating composition of claim 8 wherein the latex polymer is a partially swollen latex polymer.

10. In a process for producing an aqueous dispersed coating composition containing an aqueous dispersed polymeric binder, the process steps comprising:

copolymerizing by in-situ, non-aqueous polymerization of ethylenically unsaturated monomers, including a carboxyl functional monomer, in the presence of an epoxy resin and at least 1% of a peroxide initiator based on the weight of the monomers copolymerized, at temperatures of between about 80° C. and 180° C. to produce a carboxyl functional acrylic epoxy copolymer having an acid no. of above 30;

combining the acrylic-epoxy copolymer with a carboxyl functional latex having an acid no. of above about 15 to provide an aqueous dispersion of carboxyl functional polymers;

adding a low molecular weight diepoxide having an epoxide equivalent weight of between 100 and 5000 to the acrylic-epoxy copolymer or to the aqueous dispersion of carboxyl polymers; and crosslinking the carboxyl functional acrylic-epoxy copolymer and the carboxyl functional latex polymer with the diepoxide to produce stabilized, aqueous dispersed, microgel polymer particles having a particle size of less than 5 microns.

11. The process of claim 10 wherein the diepoxide resin is mixed with the acrylic-epoxy copolymer concurrently with dispersing into water.

12. The process of claim 10 wherein the acrylic-epoxy copolymer is first dispersed into water and the diepoxide resin is dispersed into the aqueous dispersion of the copolymer.

13. The process of claim 10 wherein the microgel polymer particles comprises by weight between 5% and 50% of the acrylic-epoxy copolymer, between 30% and 80% of the latex polymer, and the balance being the low molecular weight diepoxide.

14. The process of claim 10 wherein the latex polymer is partially swollen prior to combining with the acrylic-epoxy coploymer by adding base to the latex polymer to neutralize between 1% and 100% of the carboxyl groups of the latex polymer.

15. The process of claim 14 wherein the latex polymer is partially swollen by neutralizing between 10% and 50% of the carboxyl groups of the latex polymer.

16. The process of claim 14 wherein the base for neutralizing the latex polymer comprises ammonia, an amine, or a mixture of ammonia and amine.

* * * * *